United States Patent [19]
Persson et al.

[11] Patent Number: 6,123,466
[45] Date of Patent: Sep. 26, 2000

[54] ELECTROMAGNETIC DISPLACEMENT MEANS

[75] Inventors: Kjell-Anders Persson, Hajom; Johan Wihlander, Göteborg; Tomas Johansson, Falkenberg, all of Sweden

[73] Assignee: Victor Hasselblad AB, Sweden

[21] Appl. No.: 09/355,694

[22] PCT Filed: Feb. 2, 1998

[86] PCT No.: PCT/SE98/00147

§ 371 Date: Sep. 27, 1999

§ 102(e) Date: Sep. 27, 1999

[87] PCT Pub. No.: WO98/35268

PCT Pub. Date: Aug. 13, 1998

[30] Foreign Application Priority Data

Feb. 6, 1997 [SE] Sweden ................................. 9700434

[51] Int. Cl.[7] .............................. G03B 9/02; G03B 19/12; G03B 9/08
[52] U.S. Cl. ............................ 396/358; 396/463; 396/508
[58] Field of Search ..................... 396/463, 465, 396/466, 470, 469, 508, 358

[56] References Cited

U.S. PATENT DOCUMENTS

| | | | |
|---|---|---|---|
| 3,595,153 | 7/1971 | Saul | 396/463 X |
| 4,279,485 | 7/1981 | Grünbacher | 396/251 |
| 4,326,786 | 4/1982 | Uchiyama et al. | 396/246 |
| 4,564,278 | 1/1986 | Ohmura | 396/463 X |
| 4,881,093 | 11/1989 | Dowe | 396/497 |
| 5,532,785 | 7/1996 | Goto et al. | 396/213 |
| 5,598,244 | 1/1997 | Johansson | 396/358 X |

FOREIGN PATENT DOCUMENTS

| | | |
|---|---|---|
| 42 03 750 A1 | 8/1992 | Germany . |
| 93/25935 | 12/1993 | WIPO . |
| 96/02018 | 1/1996 | WIPO . |

*Primary Examiner*—W. B. Perkey
*Attorney, Agent, or Firm*—Lerner, David, Littenberg, Krumholz & Mentlik, LLP

[57] ABSTRACT

Apparatus is disclosed for cyclic displacement of a camera shutter mechanism or the like between first and second end positions comprising an electromagnet displacing the shutter mechanism, the electromagnet comprising a pivotable armature pivotable between first and second positions, a plurality of blades, a rocker arm connected to the armature, a linkage connecting the rocker arm to the blades whereby pivoting of the armature can be translated into rotary movement of the blades, a biasing spring for biasing the armature towards a neutral position between the first and second end positions, a driver for ensuring that the armature reaches the first and second end positions, the driver comprising a permanent magnet for holding the armature in either of the first and second end positions and counteracting the biasing spring, and at least one coil for exerting a force on the armature upon activation of the coil, the force being sufficient to overcome the permanent magnet and the biasing spring.

10 Claims, 7 Drawing Sheets

ELECTROMAGNETIC DISPLACEMENT MEANS

FIELD OF THE INVENTION

The present invention relates to an electromagnetic displacement means for effecting cyclic displacement of a mechanical system, such as a shutter mechanism, mirror mechanism, and the like, in a camera, between two end positions.

BACKGROUND OF THE INVENTION

Most cameras are provided with one or more mechanical systems which, during the sequence of taking a picture, are displaced from one end position to another, and thereafter returned to the first end position in readiness for the taking of a subsequent picture. Such systems include, for example, the viewing mirror mechanism of a single lens reflex camera, and/or the shutter mechanism and/or the diaphragm mechanism.

In terms of the viewing mirror mechanism, a common displacement means includes a return setting member, a mirror-up spring and an associated return spring, a latch and a mirror-up mechanism. A shutter charging operation energizes both the mirror-up spring and the return spring while bringing the return setting member to its set position, where it is locked by the latch. A shutter release causes the mirror-up member to be initially actuated under the influence of the mirror-up spring to drive the mirror upward. Immediately after termination of shutter operation the return setting member is unlocked from the latch, thereby allowing the setting member to be returned under the influence of the return spring until the mirror returns to its original position.

The above-described mechanism suffers from many disadvantages. Firstly, to guarantee that the mirror will indeed reach its end positions, even if the camera in which it is fitted is operated in an inverted state, the two springs must be sufficiently tensioned to overcome mechanical losses so that the mirror arrives at the end positions with at least some tension remaining in the springs. This results in the mirror being accelerated during its entire movement and therefore reaching its end positions at a maximum velocity for that movement. At the end positions the kinetic energy of the mirror and driving mechanism must be absorbed and, due to the relatively high velocity, the deceleration forces can be sufficiently high to cause the camera to shake, thereby giving rise to a blurred picture. The high velocity of the mirror also creates problems with latching of the mirror at its end positions, since the mirror can bounce back before the latch engages. The requisite high deceleration forces lead to increased noise levels and vibration while decreasing the lifespan of the camera.

Many partial solutions to the above-described problem have been proposed. For example, PCT Application No. WO 93/025935 provides a solution for effecting cyclic displacement of a mechanical system, such as a mirror mechanism, shutter mechanism, and the like in a camera, between two end positions, which avoids the risk of bounce, requires a minimal amount of energy and which is simpler than previous solutions. This is achieved by including spring means for biasing the system towards a neutral position or zone between these end positions, and drive means, activated during displacement of the system, for ensuring that the system sequentially reaches these end positions. This arrangement can also be used for cyclic displacement of a mechanical system, such as a mirror mechanism, shutter mechanism, and the like in a camera, between two end positions. The solution consists of the following steps:

I) biasing the system towards a neutral position or zone between the end positions;

II) retaining the system at one of the two end positions;

III) releasing the system from the one end position;

IV) providing an additional force to the system above that due to the biasing to ensure that the system reaches the other of the two end positions;

V) retaining the system at the other end position;

VI) releasing the system from the other end position; and

VII) providing an additional force to the system above that due to the biasing to ensure that the system reaches the one end position.

Since the system is biased towards a neutral position or zone between the end positions, the maximum velocity of the component occurs at this neutral position or zone during movement from one end position to the other. Similarly, the velocity of the system, and therefore its kinetic energy, tends to zero when approaching the end positions. As such, no complicated braking or damping system is necessitated and latching is simplified.

One disadvantage of this solution is its relative lack of speed, i.e. the system cannot react fast enough when a rapid movement is required. This is desired for fast shutter speeds in camera shutters, for example, where high speed movement of the shutter blades or curtains are essential.

Shutter operation detection devices of different types are known. U.S. Pat. No. 5,532,785 describes a system which uses a light emitting diode (LED) and a photo transistor (PTR) placed in proximity to the shutter curtains to measure the actual exposure times. The difference between the control exposure time, which is based upon the brightness value of the subject to be photographed and the film sensitivity, and the measured exposure time, is determined. The control exposure time for the next session can then be corrected based upon this difference. This system measures the time between passing of the front curtain and the rear curtain of a shutter made up of two shutter curtains by detecting reflected light bounced from the LED by means of a curtain blade to the PTR.

One disadvantage with this system is that no information is obtained as to the actual position of the shutter blades at any chosen time in the interval from start of exposure to end of exposure, ie. going from fully closed shutter to fully open shutter and back to fully closed shutter.

It is therefore an object of the present invention to provide an electromagnetic displacement means for effecting cyclic displacement of a mechanical system, such as a shutter mechanism, mirror mechanism, and the like in a camera, between two end positions, which means is capable of high speed movements with repeatability and stability, while requiring a minimal amount of energy and which is simple in construction.

SUMMARY OF THE INVENTION

In accordance with the present invention, this and other objects have now been achieved by the discovery of apparatus for the cyclic displacement of a camera mechanism between first and second end positions comprising electromagnetic means for displacing the camera mechanism, the electromagnetic means comprising a pivotable armature pivotable between first and second end positions, a plurality of blade members, a rocker arm connected to the armature, linking means connecting the rocker arm to the plurality of blade members whereby the pivoting of the armature can be translated into rotary movement of the plurality of blade members, biasing means for biasing the armature towards a neutral position between the first and second end positions, drive means for insuring that the armature reaches the first and second end positions, the drive means comprising permanent magnet means for holding the armature in either of the first and second end positions and counteracting the biasing means, and at least one coil for exerting a force on the armature upon activation of the at least one coil, the force being sufficient to overcome the permanent magnet means and the biasing means. In a preferred embodiment, the apparatus includes monitoring means for monitoring the displacement of the camera mechanism and control means for controlling the drive means in response to the monitoring means.

In accordance with one embodiment of the apparatus of the present invention, the camera mechanism comprises a viewing mirror. In another embodiment, the camera mechanism comprises a shutter mechanism.

In accordance with one embodiment of the apparatus of the present invention, the biasing means comprises spring means, preferably a pair of opposed spring members. The spring means can also comprise a leaf spring, a tension spring, or a compression spring.

In accordance with another embodiment of the apparatus of the present invention, the pivotable armature includes a pair of surfaces, each of the pair of surfaces including a plurality of tapered surfaces, and wherein the electromagnetic means includes a stator having a pair of ends proximate to the pair of surfaces of the pivotable armature, each of the pair of ends of the stator including a plurality of tapered surfaces whereby one of the plurality of tapered surfaces of the armature contacts one of the plurality of tapered surfaces of the stator when the stator is at the first and second end positions.

The objects of the present invention are achieved by means of arranging permanent magnets so that they cooperate to pull the system towards the end positions, exerting a force which, when the system is at one of the end positions, is higher than the force of the bias means towards the neutral position.

A further objective of the present invention is to provide a means for obtaining information as to the actual position of the shutter blades at any chosen time in the interval from start of exposure to end of exposure, i.e. going from a fully closed shutter to a fully open shutter and back to a fully closed shutter.

This object is achieved in accordance with the present invention by means of arranging sensor tabs suitably placed, e.g. on the linkage system which transmits the movement to the shutter blades, which sensor tabs position is detected by sensors.

BRIEF DESCRIPTION OF THE DRAWINGS

The present invention will be described in more detail in the following detailed descrition, and with reference to the attached drawings, in which.

DETAILED DESCRIPTION

Figure 1:
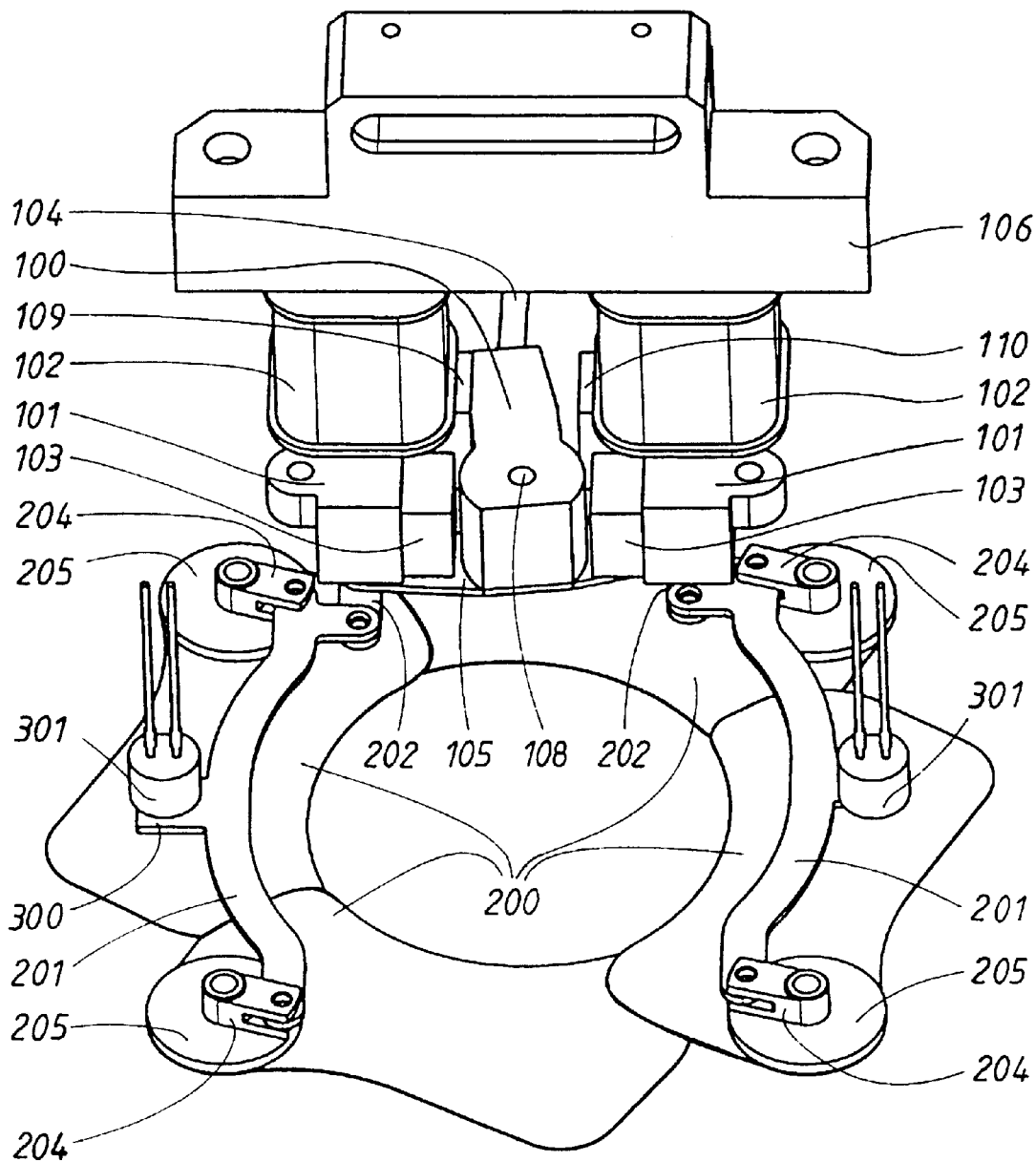
FIG. 1 is a front, elevational, partially schematic view of an embodiment of an electromagnetic displacement means according to the present invention.

FIG. 1 shows an electromagnetic camera shutter arrangement according to one embodiment of the present invention. An armature 100 is arranged to pivot around an axis 108. The armature 100 is connected to a rocker arm 105 which, in turn and in a known manner, transmits the rocking movement of the armature 100 to a rotating movement of a plurality of shutter blades 200. This is achieved by the rocker arm being connected to the shutter blades 200 through linking rods 202, parallel rods 201, shutter blade levers 204 and shutter blade lever discs 205.

Protruding from the parallel rods 201 are sensor tabs 300. The position of these sensor tabs 300 are detected by sensors 301, for example opto-electronic sensors such as photo-interrupters of the reflective type. Advantageously, the leading edges of these sensor tabs 300 are inclined with respect to the direction of travel of the sensor tabs 300. This increases the sensitivity of the detection. The sensors 301 detect the overall mechanical movement of the sensor tabs 300, and not only the end positions, i.e. the positions corresponding to the end positions of the armature 100.

The armature 100 is situated midway between the open ends 109 and 110 of a stator arrangement 101 forming part of the electromagnetic means. The stator 101 is generally U-shaped, and has at least one electromagnetic coil 102 arranged close to the open ends, 109 and 110, of the stator 101. The open ends, 109 and 110, of the stator are extensions to the U-shape, and are perpendicular to the general plane of the U-shape. The armature 100 is, furthermore, biased towards a neutral position or zone between the two open ends, 109 and 110, of the stator 101 by a force exerted by a biasing means 104. This biasing means 104 can comprise any linear or non-linear means for biasing the system towards a neutral zone, for example, one or more torsion springs, leaf springs, tension springs or compression springs, supplementary permanent magnet or magnets, or any kind of elastic means such as rubber means.

Arranged close to the open ends, 109 and 110, of the stator 101 are permanent magnets 103. These permanent magnets 103, create a magnetic field which flows in opposite directions towards the armature 100. One field flows from a first permanent magnet 103 which is situated at the particular end position which the armature 100 is occupying when it is at a first end position, through the armature 100 and then through that open end 109 of the stator 101 which is in contact with the armature 100 back to the permanent magnet 103. The other field flows from a second permanent magnet 103, which is arranged on the opposite side of the stator 101 compared to the first permanent magnet 103, through the armature 100 and then through the same open end 109 of the stator 101 back to the second permanent magnet 103, but by means of the closed end 107 of the stator 103 (which is visible in FIG. 2 but covered by a holder 106 in FIG. 1). The combined force of these two fields holds the armature in either of its two end positions, while completely counteracting the force of the biasing means 104, which strives to return the armature 100 to the neutral position.

In order to move the armature 100 from either of its end positions, a current is applied in coils 102, so that the force of the permanent magnets 103 is overcome. Because of the bias means 104 pressing towards the neutral position of the armature 100, the necessary force, and thus necessary current, is lower than if the bias means 104 had not been present.

A further improved embodiment comprises a two capacitor discharge system where two voltages are applied in succession over the coils 102. A smaller capacity, high voltage capacitor provides a higher voltage during the initial stage of the process. This yields a high current so that the current quickly reaches a sufficient level. When the armature 100 starts to move, this current can be driven by a lower voltage supply due to the decreased inductance of the system. A higher capacity, lower voltage capacitor, which either has been discharging since the smaller capacity, high voltage capacitor started discharging, or which starts discharging when the smaller capacity, high voltage capacitor has lost its charge, provides the voltage needed towards the end phase of the process when the armature has to reach its opposite end position to that from which it started.

This improves the shutter response because a smaller amount of energy has to be charged into the capacitors before the process of shutter blade movement can start, which means that the delay between pressing the shutter release button and the shutter starting its movement is decreased. The total energy consumption of the electromagnetic shutter system is also lowered.

Control means for controlling the mechanical movement system when displacement of the system diverges from the expected is also present but not indicated in the figures. The control means can be of any known type, e.g. integrated in a camera's electronic control system.

In FIG. 1, furthermore, a holder 106 is visible. This holder serves, inter alia, as a holding means for the biasing means 104.

Figure 2:
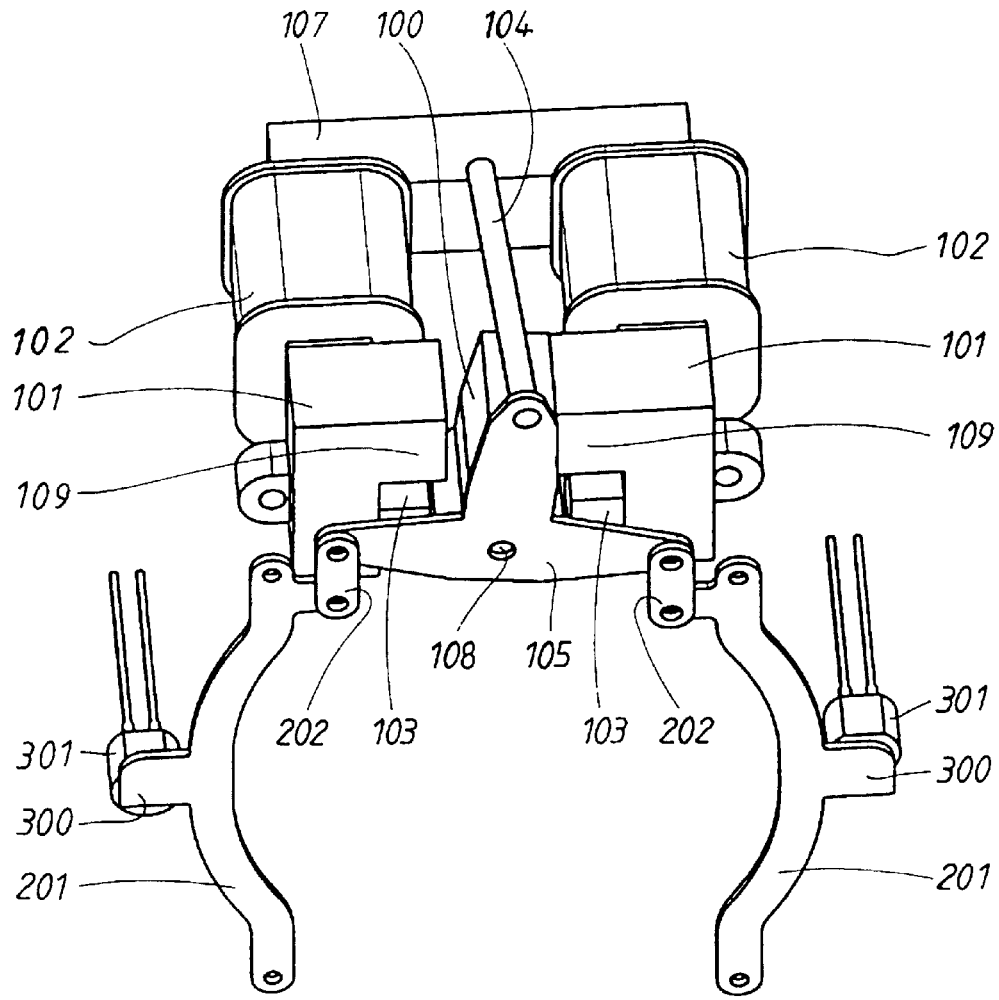
FIG. 2 is a rear, elevational, partially schematic view, from a viewing position directly opposite that of FIG. 1. and with certain features omitted, of the embodiment of FIG. 1.

FIG. 2 shows more clearly the relative arrangement of the armature 100 and the open ends, 109 and 110, of the stator 101, and, furthermore, shows one embodiment of the biasing means 104 in more detail. Also visible is the closed end 107 of the stator 101.

Figure 3:
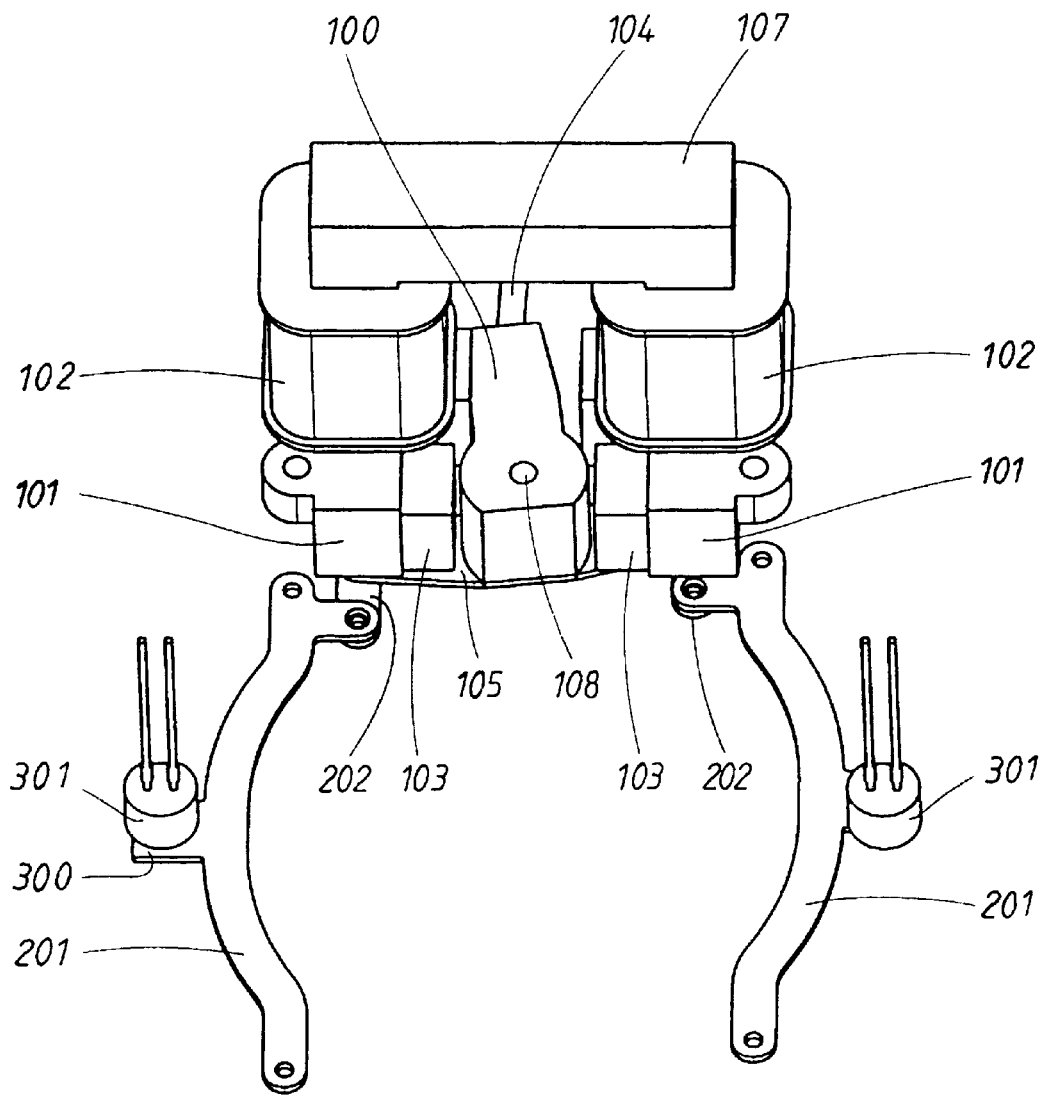
FIG. 3 is a front, elevational, partially schematic view, from a viewing position corresponding to that of FIG. 1. and with certain features omitted, of the embodiment of FIG. 1.

FIG. 3 corresponds to FIG. 1, but with several details removed for clarity.

Figure 4:
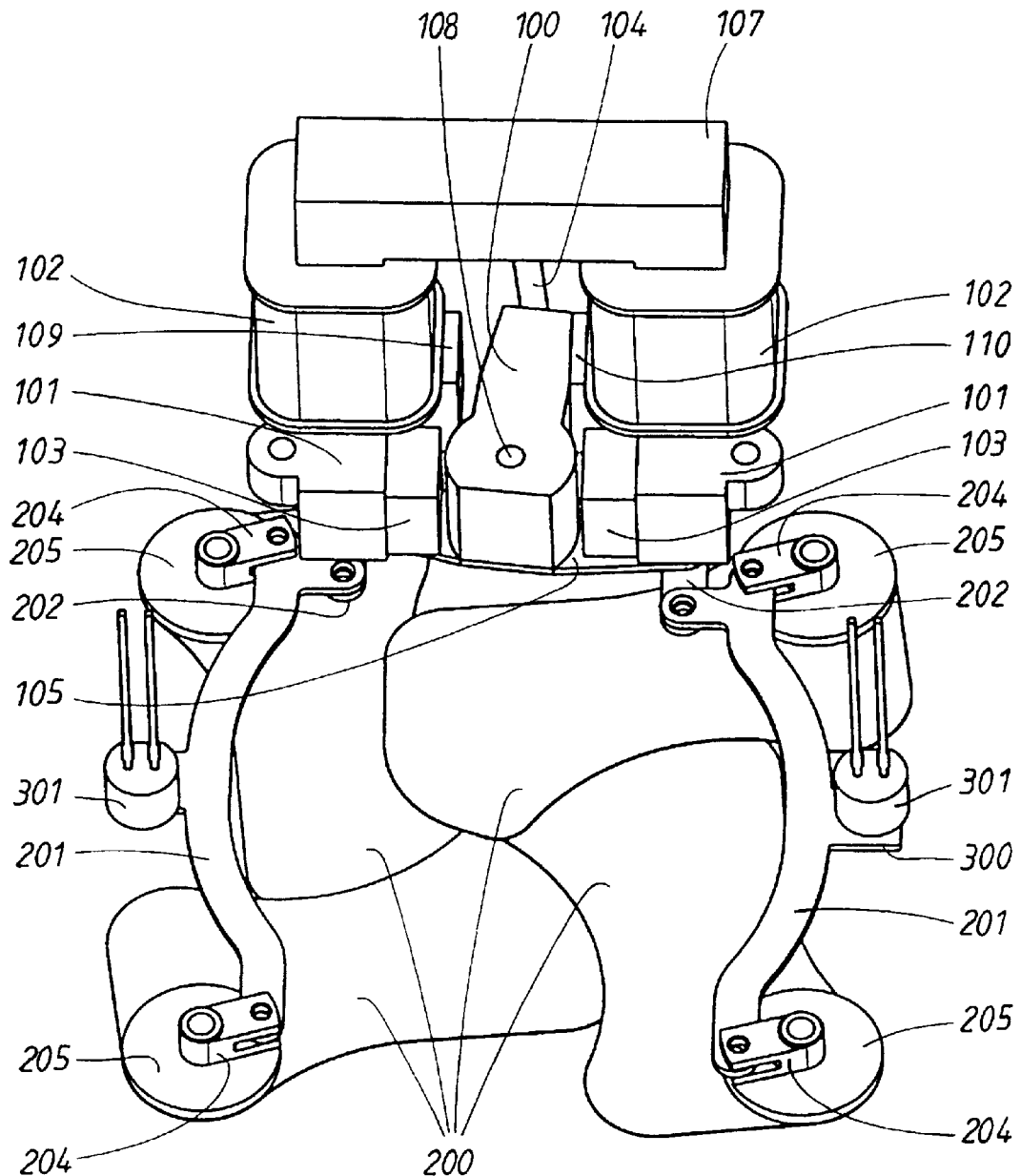
FIG. 4 is a front, elevational, partially schematic view of the embodiment of the present invention shown in FIG. 1, illustrating the system in a first end position.

FIG. 4 shows the electromagnetic camera shutter arrangement according to FIG. 1 (with the holder 106 removed), but with the shutter blades 200 in a closed position. This is the shutter position which is used during periods between film frame exposures.

Figure 5:
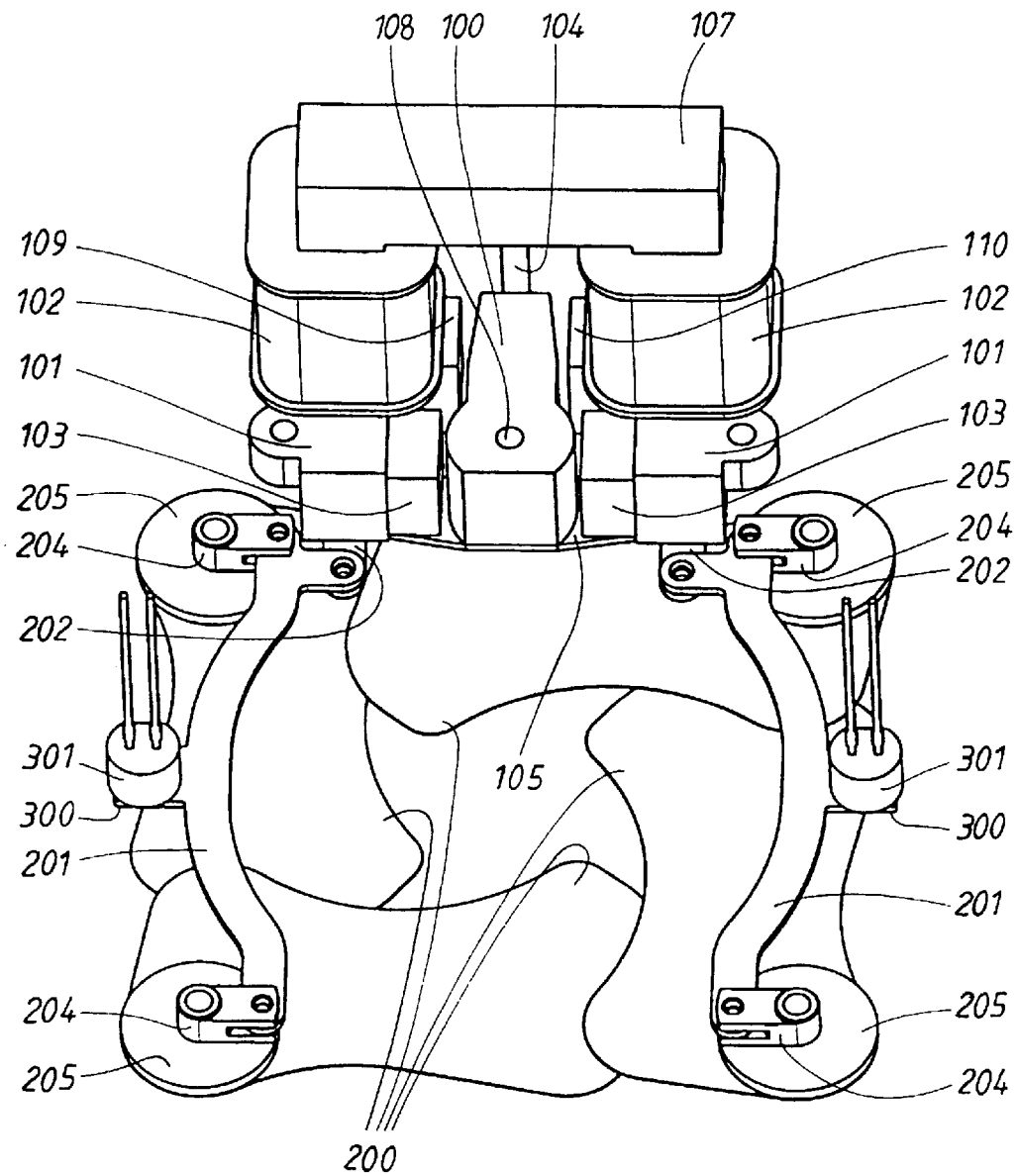
FIG. 5 is a front, elevational, partially schematic view of the embodiment of the present invention shown in FIG. 4, with the system in a neutral position.

FIG. 5 shows the same electromagnetic camera shutter arrangement as in FIG. 4, but where the armature 100 is in the neutral position and, thus, the shutter blades 200 are in a midway position between fully closed and fully opened positions.

Figure 6:
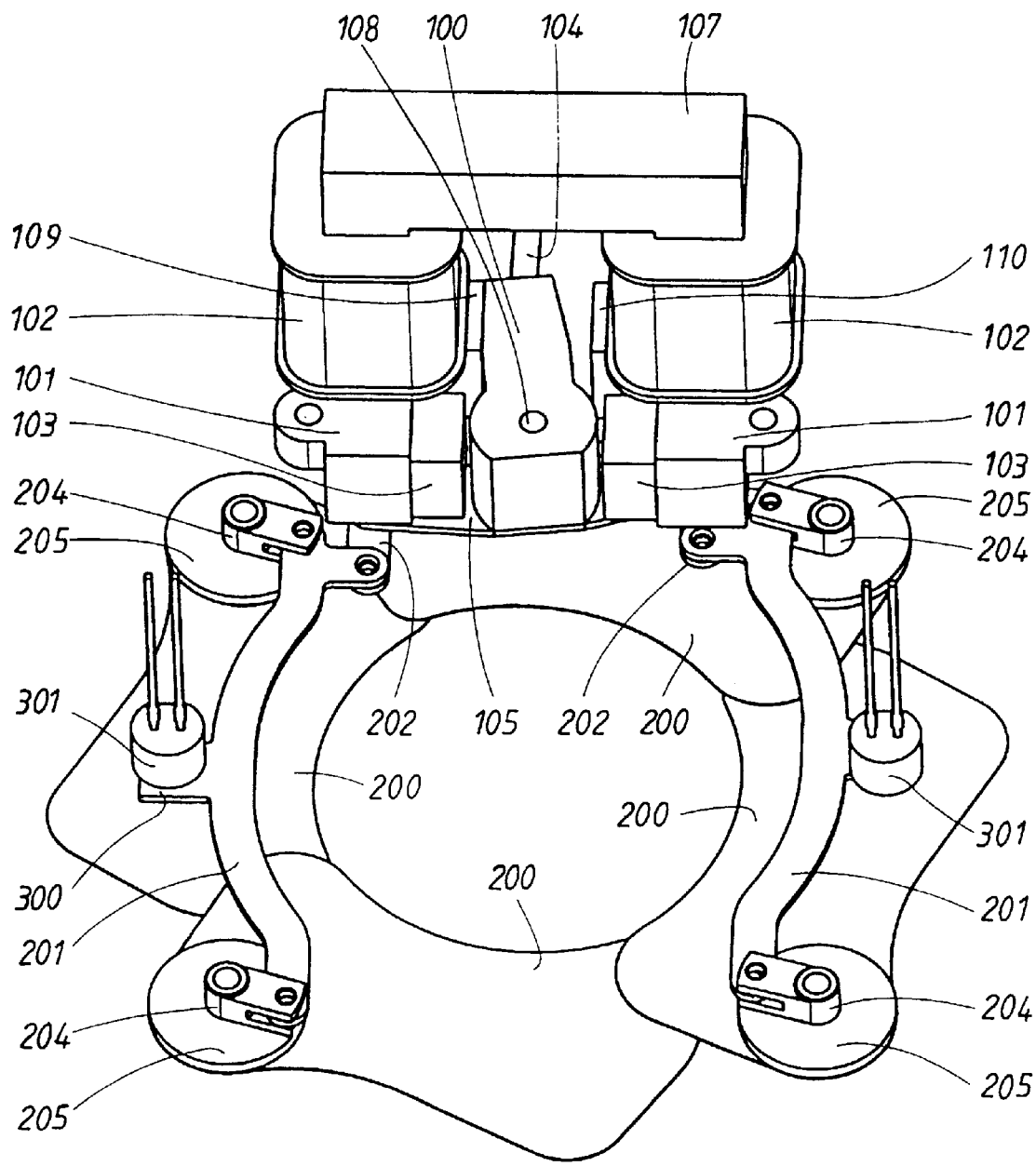
FIG. 6 is a front, elevational, partially schematic view of the embodiment shown in FIG. 4 with the system in a second end position.

FIG. 6 shows the same electromagnetic camera shutter arrangement as in FIGS. 4 and 5, but now the shutter blades 200 have reached the fully opened position. After a predetermined time, which depends upon the desired total opening time of the shutter, the armature 100 is released and travels back to the position it had in FIG. 4.

Figure 7:
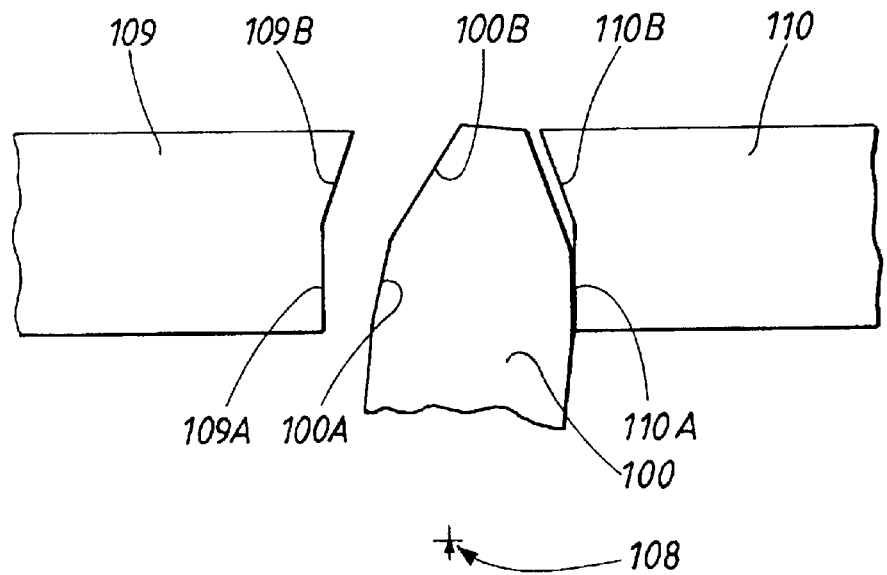
FIG. 7 is a partial, top, schematic detailed view of one embodiment of an armature and stator design in accordance with the present invention.

A preferred embodiment of armature design is shown in FIG. 7, where the armature top surface is tapered in two steps, 100A and 100B, respectively. The two open ends, 109 and 110, of the stator 101 are correspondingly negatively tapered into different surfaces, 109A, 109B, 110A, and 110B, so that the armature 100 at its two end positions is contacting the stator open ends, 109 and 110, at the surfaces, 109A and 110A, which correspond to one of the armature taper surfaces 100A. The remaining stator open end surfaces, 109B and 110B, are not in contact with the armature 100 when the armature 100 is at either of its end positions. This has the effect that the magnetic field holding the armature 100 is initially concentrated to a smaller surface 100A, when the armature 100 makes contact with the stator open ends, 109 and 110, but after the release of electric current in the coils 102, the armature 100 loses contact with the stator open ends, 109 and 110, thus enlarging the magnetic field area to include also the surface, 109B and 110B, of the stator open ends, albeit with an air gap in-between which lowers the strength of the field further.

Figure 8:
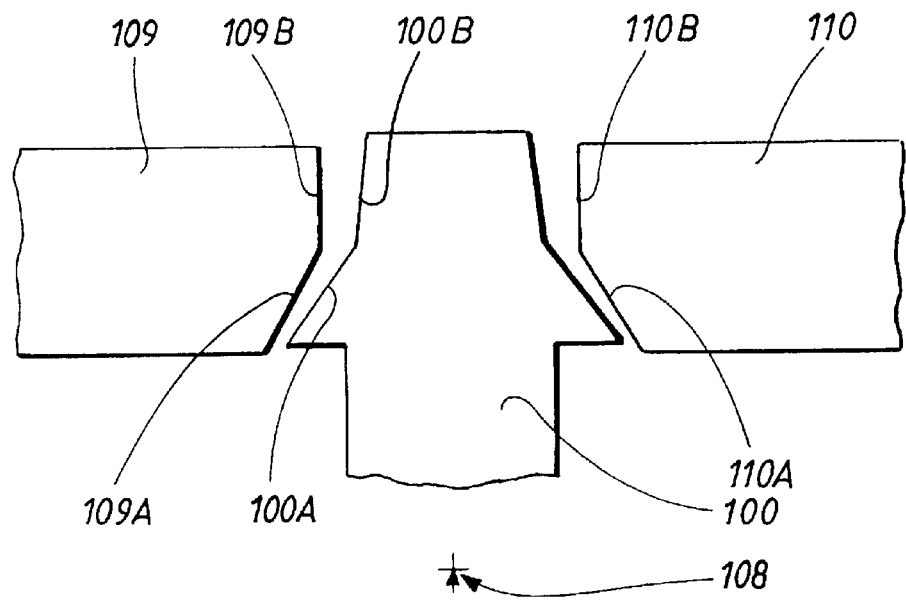
FIG. 8 is a top, schematic detailed view of another embodiment of the armature and stator design of the present invention.

A further preferred embodiment of armature design is shown in FIG. 8, where the two open ends, 109 and 110, of the stator 101 are tapered into different surfaces, 109A, 109B, 110A and 110B, and the armature top surface is correspondingly negatively tapered into different surfaces, 100A and 100B. The function of the armature/stator interaction is the same as for FIG. 7.

The present invention is not restricted to the embodiments described above or shown in the drawings, but may be varied within the scope of the appended claims. While the examples have been directed towards shutters, it is to be understood that the principles of the present invention may advantageously be applied to any camera system or optical viewing device. For example, the present invention may also be applied to the aperture, diaphragm or viewing mirror mechanisms of a camera. Also, different types of shutters are suitable for the invention, such as lens shutters or focal plane shutters. While the spring means have been described as biasing the mechanical system towards a neutral position, it is to be understood that the neutral position may in fact be a neutral zone between the end positions, such a neutral zone being defined as a zone in which the resultant force from the spring means an the mechanical system is zero.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the cyclic displacement of a camera mechanism between first and second end positions comprising electromagnetic means for displacing said camera mechanism, said electromagnetic means comprising a pivotable armature pivotable between first and second end positions, a plurality of blade members, a rocker arm connected to said armature, linking means connecting said rocker arm to said plurality of blade members whereby said pivoting of said armature can be translated into rotary movement of said plurality of blade members, biasing means for biasing said armature towards a neutral position between said first and second end positions, drive means for insuring that said armature reaches said first and second end positions, said drive means comprising permanent magnet means for holding said armature in either of said first and second end positions and counteracting said biasing means, and at least one coil for exerting a force on said armature upon activation of said at least one coil, said force being sufficient to overcome said permanent magnet means and said biasing means.

2. The apparatus of claim 1 including monitoring means for monitoring said displacement of said camera mechanism and control means for controlling said drive means in response to said monitoring means.

3. The apparatus of claim 1 wherein said camera mechanism comprises a viewing mirror.

4. The apparatus of claim 1 wherein said camera mechanism comprises a shutter mechanism.

5. The apparatus of claim 1 wherein said biasing means comprises spring means.

6. The apparatus of claim 5 wherein said spring means comprises a pair of opposed spring members.

7. The apparatus of claim 5 wherein said spring means comprises a leaf spring.

8. The apparatus of claim 5 wherein said spring means comprises a tension spring.

9. The apparatus of claim 5 wherein said spring means comprises a compression spring.

10. The apparatus of claim 1 wherein said pivotable armature includes a pair of surfaces, each of said pair of surfaces including a plurality of tapered surfaces, and wherein said electromagnetic means includes a stator having a pair of ends proximate to said pair of surfaces of said pivotable armature, each of said pair of ends of said stator including a plurality of tapered surfaces whereby one of said plurality of tapered surfaces of said armature contacts one of said plurality of tapered surfaces of said stator when said stator is at said first and second end positions.

\* \* \* \* \*